United States Patent [19]

Eitaki

[11] Patent Number: 6,078,004
[45] Date of Patent: Jun. 20, 2000

[54] ELECTRONIC MUSICAL INSTRUMENT WITH GRAPHIC REPRESENTATION OF NOTE TIMINGS

[75] Inventor: Shu Eitaki, Hamamatsu, Japan

[73] Assignee: Kabushiki Kaisha Kawai Gakki Seisakusho, Japan

[21] Appl. No.: 09/145,315

[22] Filed: Aug. 31, 1998

[30] Foreign Application Priority Data

Sep. 26, 1997 [JP] Japan ................................. 9-279855

[51] Int. Cl.[7] ................................................ G09B 15/02
[52] U.S. Cl. ............................................ 84/477 R; 84/478
[58] Field of Search ............................. 84/470 R, 477 R, 84/478

[56] References Cited

U.S. PATENT DOCUMENTS

| | | | |
|---|---|---|---|
| 5,085,116 | 2/1992 | Nakata et al. | 84/477 R X |
| 5,563,358 | 10/1996 | Zimmerman | 84/477 R |
| 5,604,322 | 2/1997 | Kikuchi | 84/477 R |

*Primary Examiner*—Jeffrey Donels
*Attorney, Agent, or Firm*—Christie, Parker & Hale, LLP

[57] ABSTRACT

In an electronic musical instrument, a controllable auto-player function controls to read out note data for an auto-play at the timings responsive to external instructions by an operation means, producing tones based on the readout note data. A display means displays in advance the tone generation timings of the respective tones to be generated on the basis of the note data with notation using a row of graphic patterns and their spacings. The graphic pattern changes to another pattern to indicate the note that has been instructed for tone generation.

13 Claims, 5 Drawing Sheets

(a) BEFORE PLAY  (b) DURING PLAY

(a) BEFORE PLAY  (b) DURING PLAY

(a) BEFORE PLAY  (b) DURING PLAY

FIG. 7

(a) BEFORE PLAY        (b) DURING PLAY

FIG. 8

(a) BEFORE PLAY        (b) DURING PLAY

ELECTRONIC MUSICAL INSTRUMENT WITH GRAPHIC REPRESENTATION OF NOTE TIMINGS

BACKGROUND OF THE INVENTION

1. [Field of the Invention]

The present invention relates to an electronic musical instrument with a controllable auto-player function, which controls an auto-play to progress tone generation in response to timings generated by instruction by a player, and a storage medium which computer-readably stores processing steps for implementing the play control function.

2. [Description of the Prior Art]

Conventionally, some electronic musical instruments are commercially available with a play control function (controllable auto-player function) for progressing an auto-play, by reading out tone information stored in a memory for generation of tones in response to successive timings generated by operations at a keyboard.

Also, an electronic musical instrument with such play control function, which sequentially displays, e.g., a raw score that represents the playing contents by the auto-player function in response to operations at a keyboard, has been proposed.

However, with the conventional electronic musical instrument having the play control function, the player is hard to control keyboard operation timings and cannot play well unless he or she is familiar with the melody to some extent.

In the electronic musical instrument which displays the score that represents the playing contents, the player can visually observe the play contents by the displayed score but cannot easily recognize the keyboard operation timings. Even if a cursor or the like is added to a note, whose sound is being currently produced, the color of that note is changed, or the display state of the note is reversed, its key-ON timing, duration, and strength cannot be recognized at a glance.

Furthermore, since this electronic musical instrument displays scores, a user who is not accustomed to reading notes may find the instrument hard to play.

SUMMARY OF THE INVENTION

The present invention has been made to remove the above-mentioned shortcomings, and has as its object to provide an electronic musical instrument with which even a user who is not accustomed to reading notes can very easily enjoy playing various songs, and to provide a storage medium containing a program which can implement the function.

According to the present invention, there is provided an electronic musical instrument with a play control function for making an auto-play progress by producing tones in accordance with timings externally instructed by instruction means, comprising:

display means for displaying graphics representing tone generation timings of tones obtained from note data that form the auto-play using arbitrary graphic patterns and spacings thereof.

According to another aspect of the present invention, the instrument further comprises control means for controlling display of the display means to change the arbitrary graphic pattern corresponding to the timing instructed by the instruction means to another graphic pattern at the timing.

According to still another aspect of the present invention, the display means further displays graphics that represent strengths of tones obtained from note data that forms the auto-play using different sizes of the arbitrary graphic patterns.

According to still another aspect of the present invention, the control means controls to sequentially display in units of a predetermined number of bars.

According to still another aspect of the present invention, the control means controls to start display of the next bar after a predetermined delay time.

According to still another aspect of the present invention, there is provided a storage medium which computer-readably stores the processing step of implementing a play control function that makes an auto-play progress by producing tones in accordance with externally instructed timings, the processing steps including the display step of displaying, on a display, graphics representing tone generation timings of tones obtained from note data that form the auto-play using arbitrary graphic patterns and spacings thereof.

According to still another aspect of the present invention, the processing step further includes the control step of performing display control to change the arbitrary graphic pattern corresponding to the externally instructed timing to another graphic pattern at the timing.

According to still another aspect of the present invention, the step further includes the step of displaying graphics that represent strengths of tones obtained from note data that forms the auto-play using different sizes of the arbitrary graphic patterns.

According to still another aspect of the present invention, the control step includes the step of controlling to sequentially display in units of a predetermined number of bars.

According to still another aspect of the present invention, the control step includes the step of controlling to start display of the next bar after a predetermined delay time.

DETAILED DESCRIPTION OF THE PREFERRED EMBODIMENTS

The preferred embodiments of the present invention will now be described with reference to the accompanying drawings.

Figure 1:
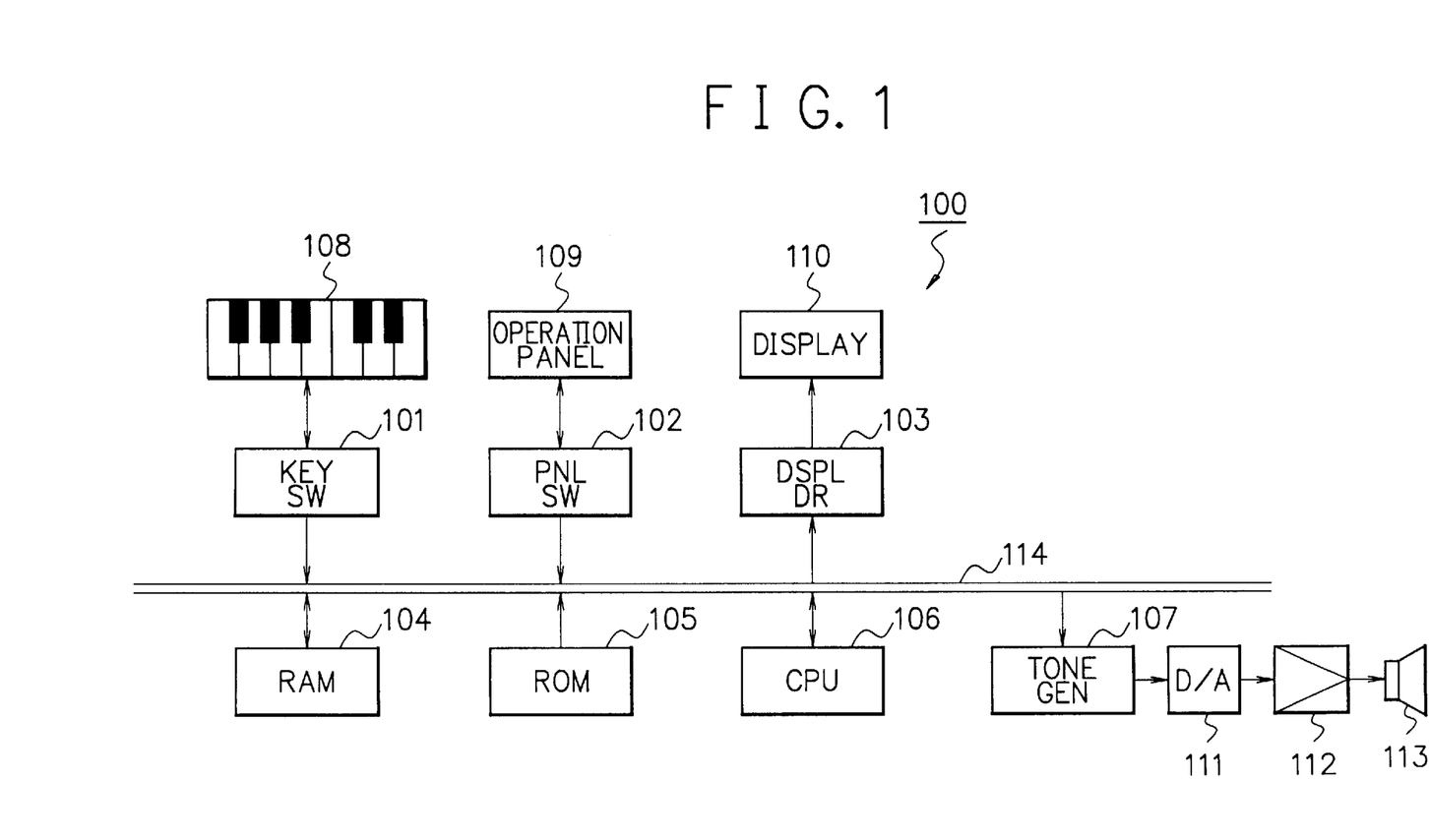
FIG. 1 is a block diagram showing an example of the arrangement of an electronic musical instrument according to the present invention.

An electronic musical instrument 100 shown in FIG. 1 is, for example, an application of the electronic musical instrument according to the present invention.

This electronic musical instrument 100 has a play control function (controllable auto-player function), and has a key switch circuit 101 for detecting the operation state on a keyboard 18, a panel switch circuit 102 for detecting the operation state on an operation panel 109, a display drive 103 for a display 110, a RAM (Random Access Memory) 104, a ROM (Read Only Memory) 105, a CPU (Central Processing Unit) 106, and a tone generator 107, as shown in FIG. 1. These components are coupled to each other via a bus 114.

A digital/analog (D/A) converter 111, amplifier 112, and loudspeaker 113 are connected in turn to the tone generator 107.

The electronic musical instrument 100 allows selection of a desired one of a plurality of songs for a play control function.

For this purpose, the operation panel 109 is provided with a switch for song selection in addition to various switches.

The ROM 105 stores auto-play data corresponding to a plurality of songs and a program for the play control function, in addition to a program for controlling the entire electronic musical instrument 100 and various data.

As will be described in detail later, the key-ON timings of the keyboard 108 for a song selected upon operation of the operation panel 109 are displayed on the display 110 in the form of dots.

Figure 2:
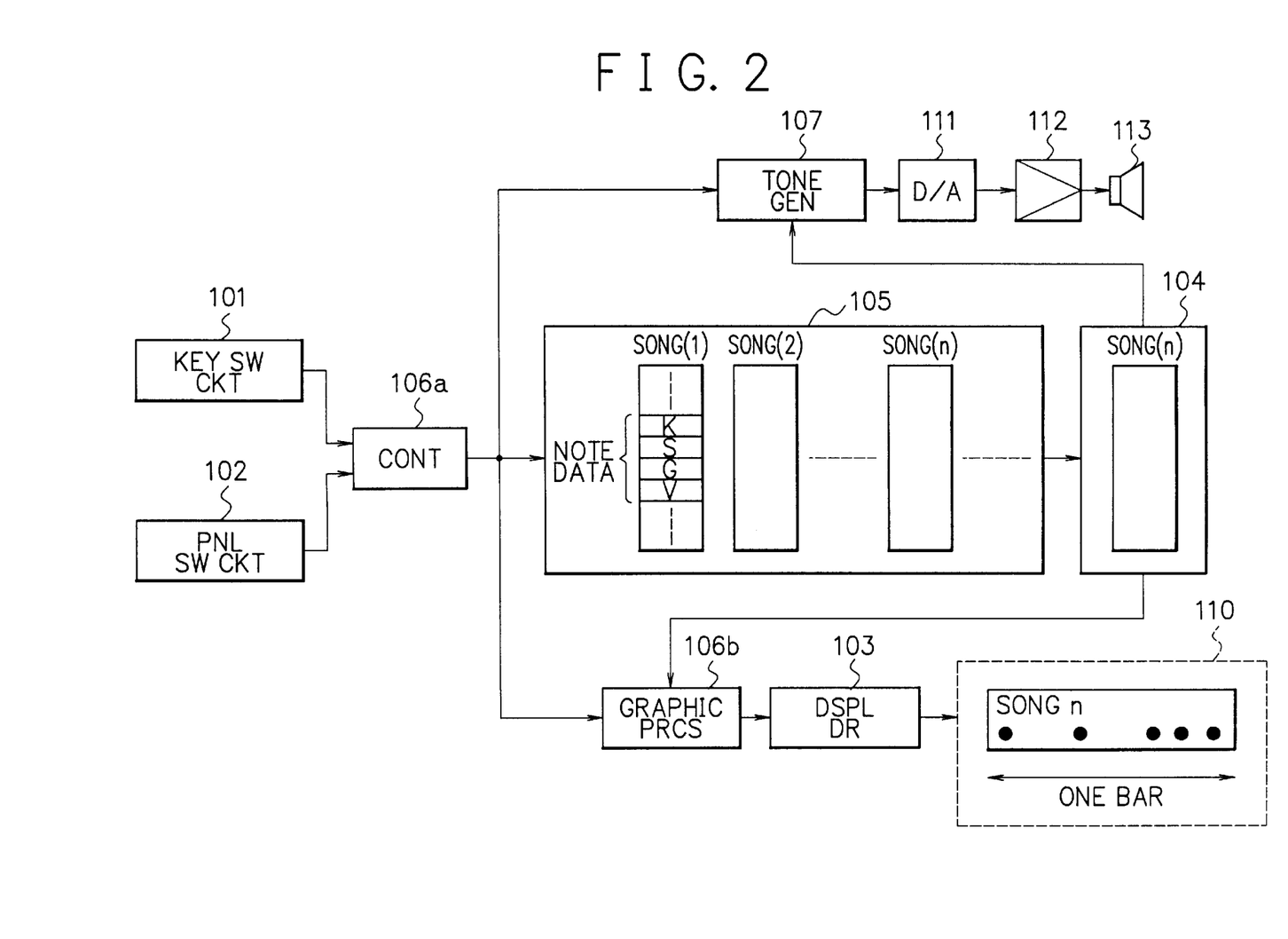
FIG. 2 is a block diagram showing the elementary features of the electronic musical instrument.

FIG. 2 specifically illustrates the elementary features of the electronic musical instrument 100.

In FIG. 2, the ROM 105 pre-stores auto-play data (1), (2), ..., (n), ... corresponding to a plurality of songs. Each auto-play data is made up of note data that form a play of the corresponding song, and contains key number data K, step time data S, gate time data G, and velocity data V.

The key number data K indicates the scale, the step time data S indicates the tone generation timing, the gate time data G indicates the duration of the tone to be generated, and the velocity data V indicates the tone volume (key-ON pressure) of the tone to be generated. The note data containing such data also contain tone color data, repeat signs of note patterns, and the like (not shown).

Figure 3:
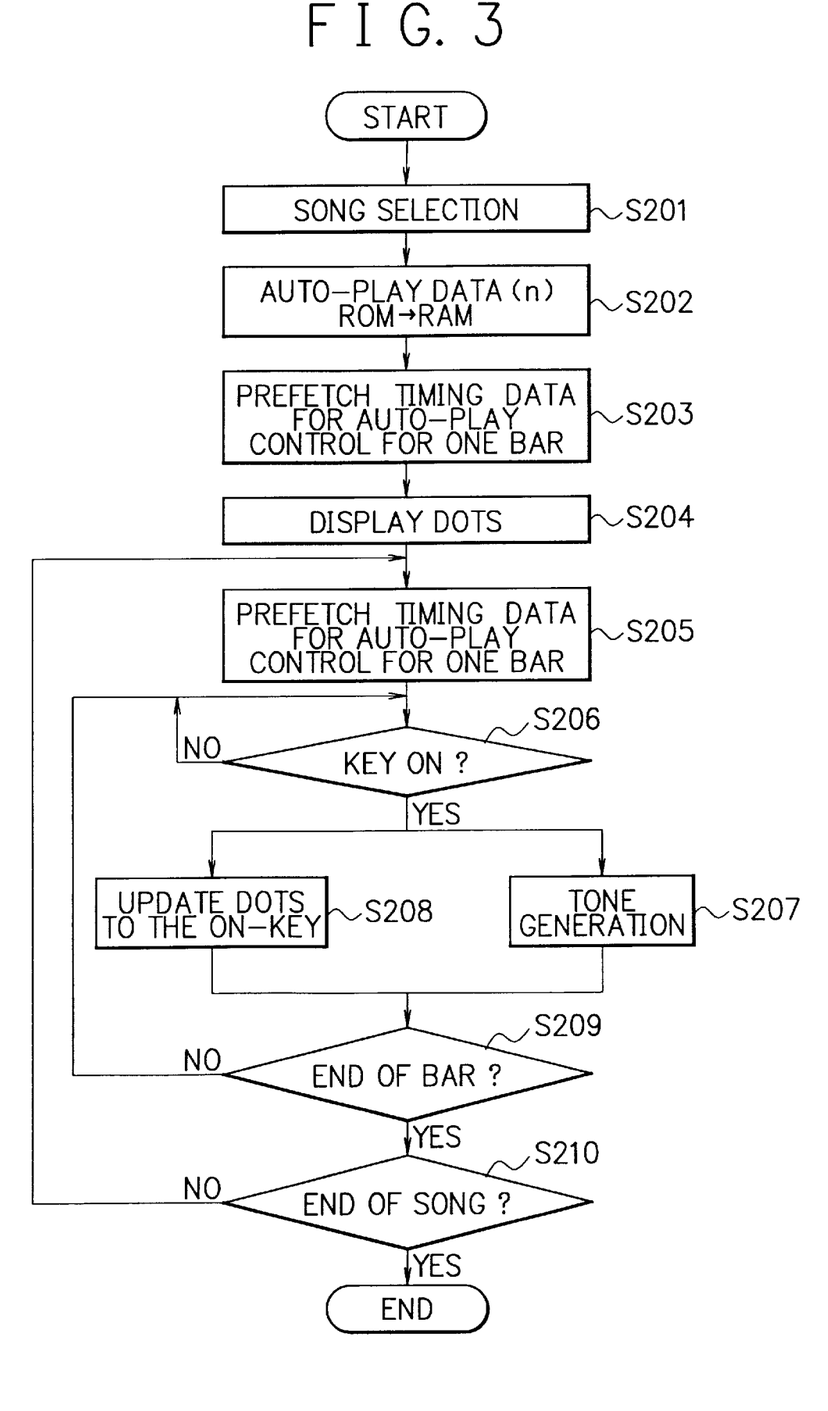
FIG. 3 is a flow chart for explaining operation of the electronic musical instrument.

A controller 106a and graphic processor 106b are implemented by a program pre-stored in the ROM 105, e.g., a program according to the flow chart shown in FIG. 3.

More specifically, when the electronic musical instrument 100 is activated, the CPU 106 reads out the program shown in FIG. 3 stored in the ROM 107, and executes the readout program to implement functions of the controller 106a and graphic processor 106b, as will be described later. Also, the CPU 106 reads out various control programs stored in the ROM 107 and executes the readout programs, thus controlling operation of the overall electronic musical instrument 100.

At this time, the RAM 104 is used as a memory for temporarily storing various data when the CPU 106 executes various kinds of control.

The operation of the electronic musical instrument 100, especially, operation upon executing the play control function under the control of the CPU 106, will be described in detail below.

When a desired song (a song (n)) is selected at the operation panel 109 (step S201), this operation information is detected by the panel switch circuit 102.

The detection result of the panel switch circuit 102 is supplied to the controller 106a. With this information, the controller 106a recognizes the selected song (n) and controls to temporarily load auto-play data (n) corresponding to the song (n) from the ROM 105 to the RAM 104.

In this way, the RAM 104 stores the auto-play data (n) made up of note data used for playing the song that the user desired.

At this time, the contents of an address register (not shown) for storing the read address of the auto-play data are reset. More specifically, the start address of the auto-play data (n) selected at that time is set as the read address in the address register (step S202).

Subsequently, the controller 106a supplies information indicating that the song has been selected to the graphic processor 106b.

With this information, the graphic processor 106b obtains timing data for the play control function from note data for one bar in the auto-play data (n) stored in the RAM 104 using the information in the address register (step S203).

For example, the controller 106b obtains data of the timings of the respective tones that form one bar (to be referred to as play control timing data hereinafter) on the basis of the step time data S and gate time data G of note data.

The graphic processor 106b generates graphic information for displaying the key-ON timings on the keyboard 108 using dot sizes and their spacings, on the basis of the play control timing data obtained in step S203, and supplies the information to the display 110 via the display drive 103.

Figure 4:
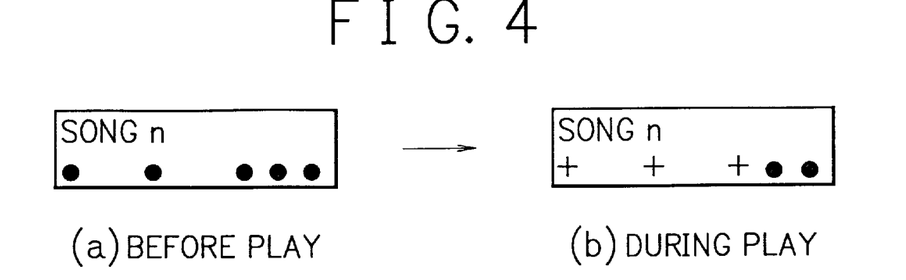
FIGS. 4(a) and 4(b) are views for explaining an example (example 1) in which key-ON timings are indicated by dots and their spacings.

Hence, the display 110 makes a dot display for one bar, as shown in, e.g., FIG. 4(a) (step S204).

As shown in FIG. 4(a), the abscissa of the display 110 is defined as the time axis in units of an appropriate note duration ranging e.g. from a sixteenth-note to eighth-note, and key-ON timings on the keyboard 108 are expressed by dots (arbitrary graphic patterns: "●") and their spacings. That is, as the note has a longer duration, a larger dot spacing is given.

The graphic processor 106b obtains play control timing data for another bar as in step S203 above, and temporarily stores them in a work memory (RAM 104) (step S205).

Then, the user presses a key on the keyboard 108 in accordance with the display contents on the display 110. This key-ON operation is detected by the key switch circuit 101.

The detection result of the key switch circuit 101 is supplied to the controller 106a, which checks based on the detection result if a key on the keyboard 108 has been pressed (step S206).

If the controller 106a determines based on the checking result that no key on the keyboard 108 is pressed, it waits for key-ON operation.

On the other hand, if the controller 106a determines based on the checking result in step S206 that a key on the keyboard 108 has been pressed, it supplies key-ON information to the tone generator 107 and graphic processor 106b at that key-ON timing.

The tone generator 107 generates tone data by performing predetermined processing for corresponding note data of the auto-play data (n) in the RAM 104 using the above-mentioned information in the address register in accordance with the key-ON information from the controller 106a. The tone data generated by the tone generator 107 is converted into an analog signal by the D/A converter 111, and is amplified by the amplifier 112. Then, a corresponding sound is produced from the loudspeaker 113 (step S207).

At the same time, the graphic processor 106b generates graphic information for rewriting the graphic pattern of the corresponding dot displayed on the display 110 to another pattern in accordance with the key-ON information from the controller 106a, and supplies the information to the display 110 via the display drive 103.

Hence, on the display 110, as shown in FIG. 4(b), the graphic pattern of dot "●" before a play changes to another pattern (in this case, "+") at the key-ON timing on the keyboard 108, i.e., the sound generation timing from the loudspeaker 103 (step S208).

After that, the controller 106a updates the contents of the address register to generate a tone in response to the next key-ON event.

The controller 106a checks using the information in the address register if the play has reached the end of the current bar (step S209).

If it is determined in step S209 that the play has not reached the end of the current bar yet, the processing repeats itself from step S206.

On the other hand, if it is determined in step S209 that the play has reached the end of the current bar, the controller 106a checks if the play has reached the end of the current song (n) (step S210).

If it is determined in step S210 that the play has not reached the end of the current song, the processing repeats itself from step S205; otherwise, this processing ends.

Hence, the display 110 displays the key-ON timings on the keyboard 108 in form of dots ("●") and their spacings every bar, and the graphic pattern of dot ("●") corresponding to the key-ON event on the keyboard 108 changes to another pattern ("+") indicating completion of play responsive to key-ON operations on the keyboard 108. Upon completion of a play for one bar, i.e., when a key corresponding to the rightmost dot displayed has been pressed, the displayed contents scroll to display the next bar.

With this processing, the player can easily recognize the currently played part, and the key-ON timings and intervals.

Especially, since the key-ON timings on the keyboard 108 are expressed by dots and their spacings, even a user who is not accustomed to reading notes can easily enjoy a play by the play control function without observing any notes.

In the aforementioned embodiment, when a display for one bar on the display 110 is scrolled, the next bar may be displayed after a predetermined period of time passed after the currently displayed pattern has changed.

More specifically, in, e.g., the flow chart shown in FIG. 3, if it is determined in step S209 that the play has reached the end of the current bar, the control waits for a predetermined delay time before the flow advances to the next processing. As a result, dots for the next bar are displayed a predetermined period of time after a key corresponding to the rightmost one of the currently displayed dots has been pressed to change its dot pattern. Hence, the player can surely confirm the end of one bar, and can start a play for the next bar.

The above-mentioned embodiment uses "●" as the graphic pattern of a dot Indicating the key-ON timing of the keyboard 108, and uses "+" as the graphic pattern representing the completion of the play. However, the present invention is not limited to these specific patterns, and any other patterns with proper sizes may be used.

Also, the key-ON strength on the keyboard 108 may be expressed by the dot size.

Figure 5:
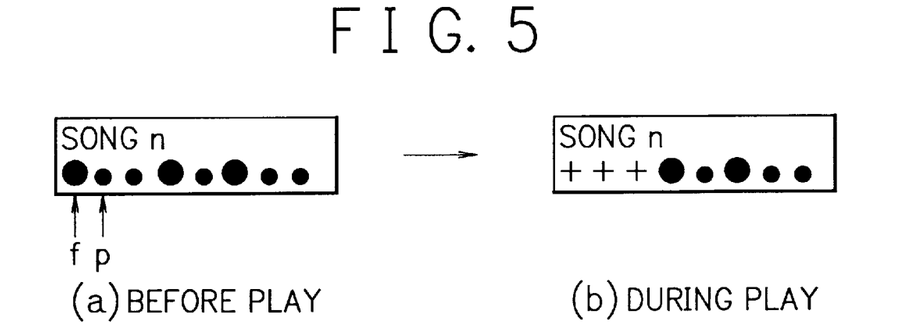
FIGS. 5(a) and 5(b) are views for explaining an example (example 2) in which key-ON timings are indicated by dots and their spacings.

For example, as shown in FIGS. 5(a) and 5(b), a large dot graphic pattern is used for expressing a strong key-ON timing (forte) on the keyboard 108, and a small dot graphic pattern is used for expressing a weak key-ON timing (piano). In this case, the graphic processor 106b generates graphic information to be supplied to the display 110 also using velocity data V contained in the note data in steps S203 and S204 above.

With these dots, the play can easily recognize the key-ON timing and strength on the keyboard 108, and can play well.

Figure 6:
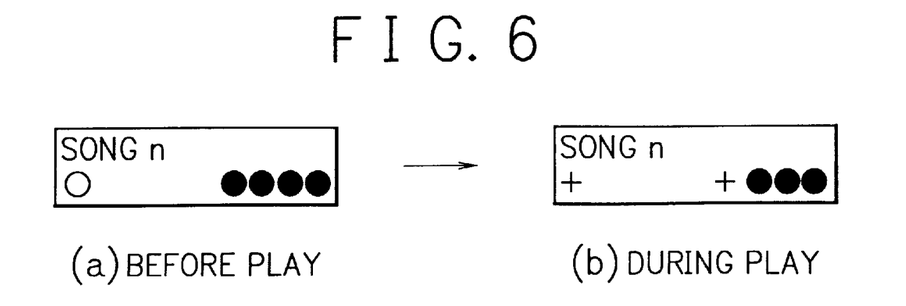
FIGS. 6(a) and 6(b) are views for explaining an example (example 3) in which key-ON timings are indicated by dots and their spacings.

On the other hand, as shown in, e.g., FIGS. 6(a) and 6(b), a dot for a longer note may be expressed by an open dot ("○") if the dot graphic pattern remains the same ("●")

With such display, the user can more easily recognize the key-ON timings and their intervals not by notes but by images that mimic notes. In this case as well, even a user who is not accustomed to reading notes notation can easily enjoy a play by the play control function without observing any notes.

Figure 7:
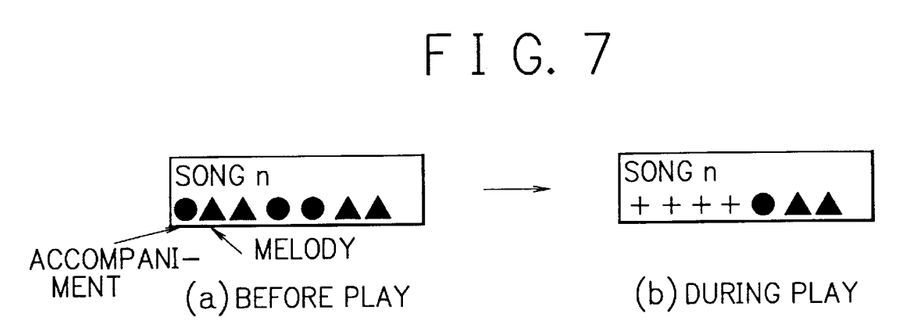
FIGS. 7(a) and 7(b) are views for explaining an example (example 4) in which key-ON timings are indicated by dots and their spacings.

Furthermore, as shown in, e.g., FIGS. 7(a) and 7(b), different graphic patterns "●" and "▲" may be respectively used for dots corresponding to an accompaniment and melody.

In this case, flags for identifying data for an accompaniment or melody are assigned to note data that form a song, and the graphic processor 106b generates graphic information to be supplied to the display 110 by discriminating an accompaniment or melody using these flags.

In this manner, the player can easily recognize an accompaniment and melody to enjoy the play with broadening variations of plays using the play control function.

Figure 8:
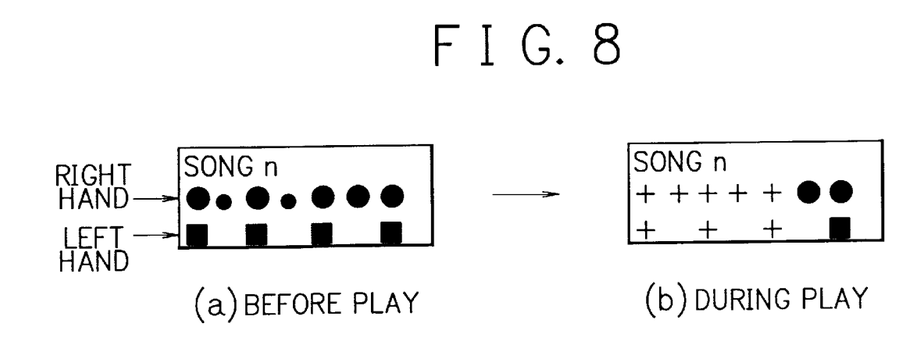
FIGS. 8(a) and 8(b) are views for explaining an example (example 5) in which key-ON timings are indicated by dots and their spacings.

Moreover, as shown in, e.g., FIGS. 8(a) and 8(b), dot graphic patterns corresponding to an accompaniment (left hand) and melody (right hand) are displayed in two rows using different patterns "●" and"■".

In this case as well, flags for identifying data for an accompaniment or melody are assigned to note data that form a song, and the graphic processor 106b generates graphic information to be supplied to the display 110 by discriminating an accompaniment or melody using these flags.

In this way, a play by the independent play control functions for the right and left hands can be copied with, thus broadening variations of plays.

The objectives of the present invention are also achieved not only by the electronic musical instrument 100 in the above embodiment, but also by supplying a storage medium which stores a program code of software that implements the functions of the CPU 101 to a system or apparatus, and executing the program code read out from the storage medium by a computer (or CPU or MPU) of the system or apparatus.

As a storage medium for supplying the program code, for example, a floppy disk, hard disk, optical disk, magnetooptical disk, CD-ROM, CD-R, magnetic tape, nonvolatile memory card, ROM, and the like may be used.

To recapitulate, according to the present invention, the display means displays the timings to be instructed by the player at the instruction means using arbitrary graphic patterns (symbols such as "●") and their spacings. With such display, since the player can visually confirm the current instruction timing, and the interval between that timing and the next instruction timing, he or she can play even an unfamiliar song. Even a beginner, especially, a user who is not accustomed to scores (notes) themselves, can play well without observing any notes. Furthermore, since even an expert user can visually confirm timings, the pleasure of a play by the play control function is enhanced.

On the display means, the graphic pattern corresponding to the timing that has been instructed changes to another pattern at that timing (e.g., from "●" to "+"). With these patterns, the player can easily recognize the currently played part, and the next instruction timing.

Furthermore, the display means displays the timings in graphic patterns corresponding to the strengths of tones (a graphic pattern corresponding a tone to be generated strongly is large, and a graphic pattern corresponding to a tone to be generated weakly is small). In this fashion, the player can visually confirm the instruction timings, and also their strengths. Hence, the player can play a desired song easily, thus broadening variations of plays.

The display means makes a display in units of a predetermined number of bars (e.g., one or two bars). Accordingly, the player can more easily recognize the currently played part and the next instruction timing. Also, the player can easily recognize the start timing of the next bar.

The display means starts (scrolls) display of the next bar after a predetermined period of time passed after completion of a play for, e.g., one bar, i.e., after the last instruction of the current bar has been input, and the graphic pattern corresponding to that instruction timing has changed to another pattern. With this display, the player can surely recognize the end of one bar, and can start a play for the next bar.

Furthermore, the timings to be instructed by the player at, e.g., a keyboard are displayed using arbitrary graphic patterns (symbols such as "●") and their spacings. With such display, since the player can visually confirm the current instruction timing, and the interval between that timing and the next instruction timing, he or she can play even an unfamiliar song. Even a beginner, especially, a user who is not accustomed to scores (notes) notation can play well without observing any notes. Furthermore, since even an expert user can visually confirm timings, the pleasure of a play by the play control function is enhanced.

On a display, the graphic pattern corresponding to the instructed timing changes to another pattern at that timing (e.g., from "●" to "+"). With these patterns, the player can easily recognize the currently played part, and the next instruction timing.

Moreover, the display displays the timings in graphic patterns corresponding to the strengths of tones (a graphic pattern corresponding a tone to be generated strongly is large, and a graphic pattern corresponding to a tone to be generated weakly is small). In this fashion, the player can visually confirm the instruction timings, and also their strengths. Hence, the player can play a desired song easily, thus broadening variations of plays.

The display makes a display in units of a predetermined number of bars (e.g., one or two bars). Accordingly, the player can more easily recognize the currently played part and the next instruction timing. Also, the player can easily recognize the start timing of the next bar.

In addition, the display starts (scrolls) display of the next bar after a predetermined period of time passed after completion of a play for, e.g., one bar, i.e., after the last instruction of the current bar has been input, and the graphic pattern corresponding to that instruction timing has changed to another pattern. With this display, the player can surely recognize the end of one bar, and can start a play for the next bar.

What is claimed is:

1. An electronic musical instrument having a controllable auto-player function to progress an auto-play for producing tones in response to timings generated externally by a player operable instruction means, comprising:

display means for displaying graphics including a plurality of graphic patterns for representing tone generation timings of tones to be produced on the basis of note data for performing the auto-play, said graphics comprising different sizes of graphic patterns to represent different strengths of tones; and control means for controlling display of said graphics to change a graphic pattern to a different graphic pattern at a timing that has been generated by said instruction means to indicate that corresponding note has been played.

2. An instrument according to claim 1, wherein said control means sequentially displays the graphics in units of a predetermined number of bars.

3. An instrument according to claim 2, wherein said control means starts display of a next bar after a predetermined delay in time.

4. An instrument according to claim 1, wherein said control means prevents display of a tone pitch.

5. An electronic musical instrument comprising:

a controllable auto-player to progress an auto-play for producing tones in response to timings generated externally by a player operable instruction means; and display means for displaying graphics including a plurality of graphic patterns and spacings thereof for representing tone generation timings of tones to be produced on the basis of note data for performing the auto-play wherein, said display means further displays graphics comprising different sizes of graphic patterns to represent strengths of tones to be generated with the note data for the auto-play.

6. A storage medium which computer-readably stores the processing step of implementing a controllable auto-player function that progresses an auto-play for producing tones in response to timings generated externally by player operable instruction means, the processing steps including:

displaying, on a display, graphics including a plurality of graphic patterns and spacings thereof for representing tone generation timings of tones to be generated on the basis of note data for performing the auto-play, said graphics comprising different sizes of graphic patterns to represent different strengths of tones; and controlling display of said graphics to change a graphic pattern to a different graphic pattern at a timing that has been generated by said instruction mens to indicate that corresponding note has been played.

7. A storage medium which computer-readably stores the processing step of implementing a controllable auto-player function that progresses an auto-play for producing tones in response to timings generated externally by player operable instruction means, the processing steps including displaying, on a display, graphics including a plurality of graphic patterns and spacings thereof for representing tone generation timings of tones to be generated on the basis of note data for performing the auto-play, wherein the step further includes the step of displaying graphics comprising different sizes of graphic patterns to represent strengths of tones to be generated with the note data for the auto-play.

8. A medium according to claim 6, wherein the control step includes the step of controlling to sequentially display the graphics in units of a predetermined number of bars.

9. A medium according to claim 8, wherein the control step includes the step of controlling to start display of a next bar after a predetermined delay in time.

10. A method for displaying graphical representations of played tones in an electronic musical instrument having a display and a controllable auto-play function for producing musical tones based on note data, said method comprising the steps of:

produce tones responsive to input timings generated by a player's instructions;

displaying a plurality of graphic patterns representing the tone generation timings wherein, the size of a graphic pattern changes to a different size responsive to different strengths of tones; and controlling the display of said graphic patterns to change a graphic pattern to a different graphic pattern when a respective note has been played.

11. The method of claim 10 wherein, the graphic patterns change to different sizes responsive to different strengths of tones.

12. The method of claim 10 wherein, a first set of graphic patterns is identified with an accompaniment and a second set of graphic patterns is identified with a melody.

13. An electronic musical instrument having a controllable auto-player function for producing tones in response to timings generated by a player's instructions, comprising:

a graphic processor configured to display graphic patterns representing the tone generation timings wherein, said graphic patterns comprising different sizes of graphic patterns to represent different strengths of tones; and a controller to control the display of said graphic patterns to change a graphic pattern to a different graphic pattern when a respective note has been played.

* * * * *